COMPUTING APPARATUS

Filed Dec. 3, 1957 2 Sheets-Sheet 1

Inventors
William A. Hosier
Thomas A. Puorro
by Edgar H. Kent Atty.

Inventors
William A. Hosier
Thomas A. Puorro
by Edgar H. Kent Atty.

United States Patent Office 3,018,956

Patented Jan. 30, 1962

3,018,956

COMPUTING APPARATUS

William A. Hosier and Thomas A. Puorro, Stoneham, Mass., assignors, by direct and mesne assignments, to Research Corporation, New York, N.Y., a corporation of New York Filed Dec. 3, 1957, Ser. No. 700,427
5 Claims. (Cl. 235—157)

This invention relates generally to digital computers and more particularly it relates to the control of such computers via stored programs.

An important tool in the programming of digital computers having stored programs is the branch instruction whereby, for example, a sub-routine of a program may be called into play to perform a series of operations of a frequently recurring nature. Branch instructions are classified as either conditional or unconditional depending upon the manner in which the branching operation is effected. If the instruction requires that certain digital criteria be met in order for the branch to occur, then the instruction is said to be conditioned.

Oftentimes the sign of a number in an operand is employed to condition a branch, which is the basis for the designation of certain instructions as branch on minus or branch on plus. If the condition for such an instruction is met, that is if the proper sign appears, then the next instruction to be performed is taken not in order but generally from an address specified by the address portion of the branch instruction itself.

A problem that has arisen with conditional branch instructions hitherto, is that frequently they require accompanying cycling instructions to shift the operand digits or bits around so that the sign bit occupies a predetermined bit position or place. The reason why such a shift may be required is that oftentimes it is desirable to pack within an operand word more than one piece of data, and since such pieces of data may be of variable bit length, the sign bits associated therewith may occur anywhere throughout the operand word. If control of the program is to be dependent upon particular bits, it follows that they must be selectively sensed, and the cycling thereof into a predetermined bit position has been the conventional way of accomplishing this result hitherto. As is apparent, cycling requires extra computer operating time and extra work on the part of the programmer which it would be desirable to avoid.

Accordingly, one object of the invention is to provide for a more flexible mode of branching control of the program in a digital computer.

Another object of the invention is to provide for a novel mode of stepping to an instruction to which the program is to be branched.

Another object of the invention is to provide for the novel use of tag items in a digital computer.

Still another object of the invention is to expedite certain operations of digital computers through the use of such tag items.

The novel features of the invention together with further objects and advantages thereof will become apparent from the following description taken in connection with the accompanying drawings wherein.

Figures 1, 2:
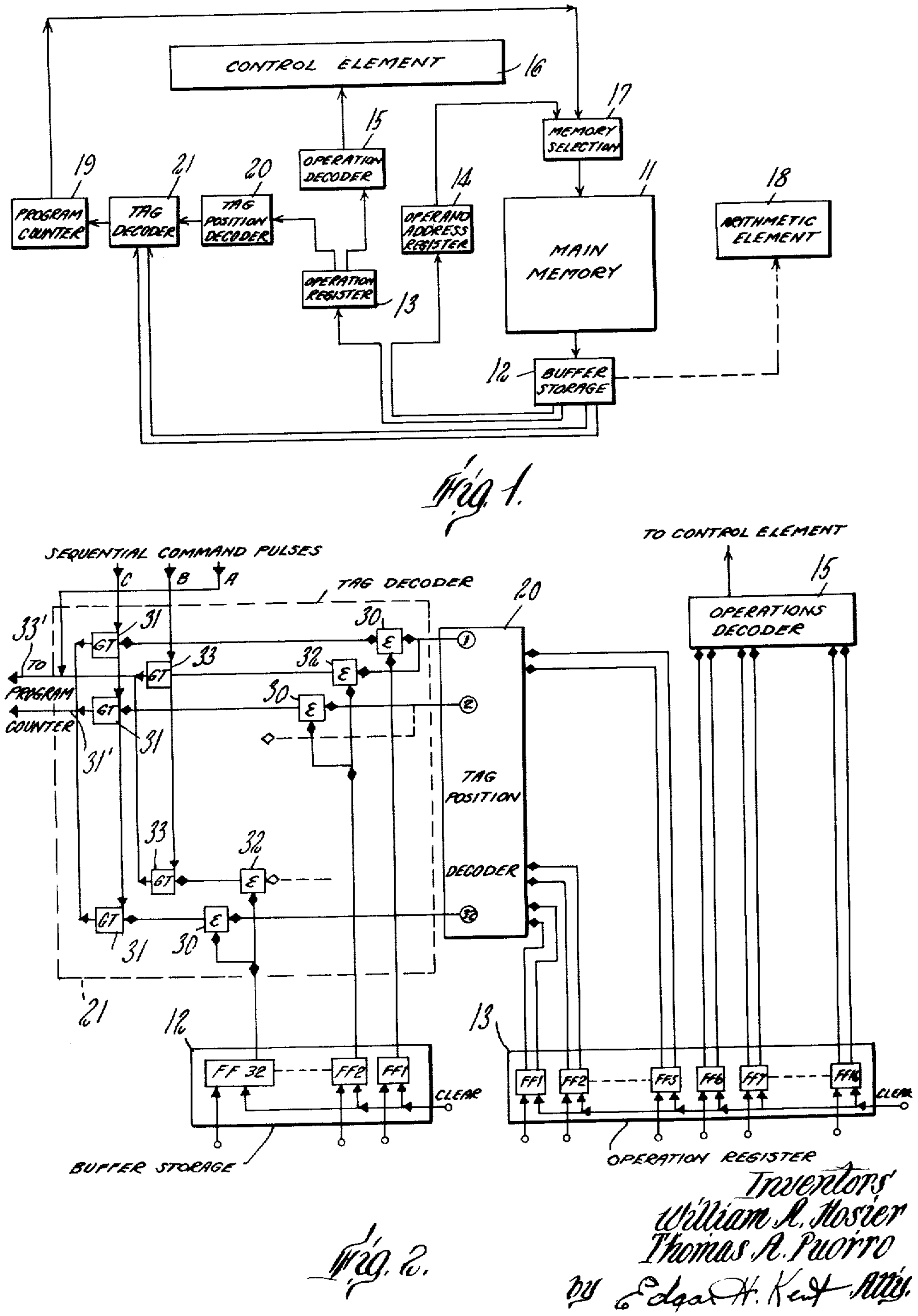
FIG. 1 is a block diagram of a digital computer incorporating the apparatus according to the present invention.
FIG. 2 is a more detailed block diagram of the tag position decoder and tag decoder of FIG. 1.

With reference now to FIG. 1, the organizational block diagram of a computer to which the invention has been applied by way of example is seen to include a main memory element 11 for storing instructions, as well as operands to which the instructions pertain. Each instruction comprises a group of bits, generally referred to as a word, which conveys the instructional information in digital form, a part of the word pertaining to the particular operation that is to be performed in the computer, generally on an operand, and the other part pertaining to the address of the operand in main memory.

Associated with the main memory element 11 is a buffer storage unit 12 which is employed to store temporarily the words that are being exchanged with main memory. In the case of instructional words, there are provided for their operations portions an operation register 13 and for their address portions an operand address register 14. The digital information contained in the operation register is decoded in an operation decoder 15 which functions in association with a control element 16, to carry out the operation specified by the instruction. Although conventionally there will be a relatively large number of command lines emanating from control element 16, these have been omitted in the drawings since they may be entirely conventional and bear no relation to the apparatus of the invention. Suffice it to say that when the operation register has been loaded and the information contained therein decoded, control element 16 is adapted to generate and distribute whatever pulses are necessary to carry out the operations that are to be performed. If, for example, certain arithmetic operations are to be performed on a particular operand, the operand is obtained from main memory by means of a memory selection unit 17 which is responsive to the contents of the operand address register. In other words, the operand is selected on the basis of its address as indicated by the contents of register 14, and is transferred from main memory to the buffer storage unit 12. In the assumed case, the operand would then be entered in an arithmetic element 18 whereby various operations such as adding, subtracting, and so forth might be performed.

When such arithmetic operations have been completed, the next instruction will ordinarily be taken from a sequentially numbered address of main memory by means of the memory selection unit 17, which in this instance is made responsive to a program counter 19. As is well known, the function of program counter 19 is to count or add one on each of the individual instructions, so that upon completion of each one of them, the count will correspond to the address for the instruction next in order. Thus, in a conventional computer organization, the program counter would be stepped once by each instruction in order to obtain the next sequential instruction from main memory.

According to the invention, however, apparatus is provided to cause skips in the count of the program counter according to predetermined criteria involving both the instructional words and the operand words. In particular, the apparatus of the present invention includes a tag position decoder 20 which is adapted to decode certain digits held in the operation register 13 and to provide in response thereto, a designation of certain bit positions in an operand word having been entered in the buffer storage unit 12. A tag decoder 21 is also provided to decode the bits designated in this manner and, depending upon their sense, to vary the count in the program counter by a corresponding amount. In the preferred embodiment herein, a variable number of counts are added to the program counter in response to the tag decoder 21 thereby causing the computer to skip one or more instructions in the program.

A specific example will serve to illustrate this mode of controlling the operation of the program counter more clearly. Thus, in a branch instruction of the type with which the apparatus of the present invention is concerned, there will be assigned five bit positions of the operational part of the instructions to designate a location of an adjacent group of bits in an operand word. This adjacent group of bits will be hereinafter referred to as a tag item and since in the specific example the operand words will be assumed to be 32 bits in length, the aforetioned 5 bits of the instruction are capable of designating any one of the 32 bits positions. Owing to the fact, however, that the number and relative location of the bits in the tag item may be fixed, a single bit position in the 32 bit word may be designated to uniquely specify the location of the entire group of bits comprising the tag item. In the specific example herein, the tag item is comprised of 2 bits and one of these bits is designated by the 5 bits of the instruction word. Accordingly, when this group of 5 bits has been entered in the operation register, the tag position decoder 20 senses them and indicates to the tag decoder, the bit position in the corresponding operand word wherein this designated bit of the tag item bit is to be found. This one of the tag item bits may be thought of as an index bit since the tag decoder is conditioned to respond not only to this one bit alone, but also to the other of the two bits as aforementioned comprising the tag item.

In accordance with the remainder of the instruction, an operand will then be obtained from main memory and transferred to the buffer storage unit 12. While in the buffer storage unit, the tag item of the operand word is sensed by the tag decoder 21, the same having been conditioned to respond to the appropriate bits of the operand by the tag position decoder 20. Since there are two bits in the tag item, it follows that four different modes of operation of the program counter may be called for. Thus, the program counter may be caused to advance by one, two or three or four counts before the next instruction is initiated, with the result that a number of from one to three of the next succeeding instructions may be effectively skipped. It is seen therefore, that according to the invention, a novel type of branching operation is effected which differs from conventional branching operations not only with respect to the mode of conditioning the branch, but also with respect to the manner in which the branching operation is carried out, namely through the use of the program counter receiving a variable count. In this regard it will be understood that this novel mode of operation may be used to supplement other conventional modes of operation, and will be called into play only when instructions containing the 5 bit tag position code occur in the program. Otherwise, the program counter will be stepped a single count at a time.

In FIG. 2 there is shown a more detailed block diagram of the apparatus according to the present invention, together with the units of the computer with which it is closely associated. Throughout this FIG. 2, double arrow heads will be used to indicate the application of a D.C. level and single arrowheads to indicate a pulse. The operation register 13 which is located in the lower right-hand corner of FIG. 2 is seen to include 16 flip-flops (six of which are actually shown) corresponding respectively to the 16 bits which in the specific example comprise the operations portion of an instructional word. The states of the flip-flops 1 through 5 are adapted to represent the 5 bit tag position code of the instruction, and the stats of flip-flop 6 through 16 are adapted to represent the operational code of the instruction. Thus, the outputs of flip-flops 6 through 16 are supplied to the operations decoder 15 so that the appropriate commands may be generated by means of the control element 16. The outputs of flip-flops 1 through 5, on the other hand, are applied to the tag position decoder 20 which in turn is adapted to provide a D.C. level on one of 32 output lines as specified by the code. Each of these output lines feeds an AND circuit 30 whose output is appiled to a gate circuit 31. Each gate 31 is conditioned by a pulse on a line labeled C and has its output connected in common with all the other gate circuits of like number.

In addition to the AND circuits 30, there are provided another group of AND circuits 32 having respective inputs also connected to the output lines from the tag position decoder 20. AND circuits 32 have their output lines connected to individual gate circuits 33 which are conditioned by a pulse on a line labeled B. Gate circuits 33 likewise have their outputs connected in common. The other inputs of AND circuits 30 are responsive to the states of the respective flip-flops which go to make up the buffer storage unit 12. More particularly, the AND circuit 30 in the number 1 output line of the tag position decoder is connected to flip-flop 1 of the buffer storage unit, the AND circuit in the number 2 output line of the tag position decoder has an input from flip-flop number 2 of the buffer storage unit and so forth. The flip-flops may be of the conventional type which provide positive and negative D.C. levels on two output lines, but only one of the buffer storage flip-flop output lines is needed. In the operations register, on the other hand, both flip-flop lines are required for the operation of the tag position decoder, as will appear hereinafter.

The output lines from the flip-flops in the buffer storage unit, in addition to being applied to corresponding AND circuits 30, serve as inputs for AND circuits 32 as well. Thus flip-flop 2 of the buffer storage unit is connected to the AND circuit 32 having an input derived from line 1 of the tag position decoder; flip-flop 3 serves as an input to the AND circuit 32 having an input derived from line 2 of the tag position decoder, and so forth. Finally there is provided a command line labeled A, which is common to the outputs from gate circuits 33.

In operation, the AND circuits 30, 32 and the gate circuits 31, 33 perform the function of the tag decoder 21 of FIG. 1. In other words, depending on the sense of the first 5 bits in the operation register, as specified by the conditions of the corresponding flip-flops, one of the AND circuits 30 and 32 will have their input conditioned by a D.C. level from the tag position decoder 20. By way of example, assume that the number 1 line of the tag position decoder is energized and that flip-flop one in the buffer storage unit is set to one so that its output line also has a positive D.C. level applied thereto. Under these conditions a positive D.C. level will appear on the output line of the AND circuit 30 in the number 1 decoder line, indicating that the first bit position in the buffer storage register is the most significant bit of the tag item, and that one is the digit stored in this position. When the line C is pulsed, an output pulse will appear on the line common to the gate circuits 31 labeled line 31'. Flip-flop 2 of the buffer storage unit will also be sensed owing to the fact that AND circuit 32, one of whose inputs is connected to the same output line 1 as AND circuit 30 aforementioned, derives the other of its inputs from flip-flop 2. If in the example, flip-flop 2 was set to the one state, so that its output line had impressed thereon a positive D.C. level, there would appear on the output line of the AND circuit 32 a positive D.C. level to condition the corresponding gate 33 to pass a pulse on line B. It will be understood, therefore, that the state of flip-flop 2 represents the least significant of the two bits comprising the tag item and that the circuit of the tag decoder 21 serves to sense this bit of the tag item in much the same manner as the most significant bit is sensed.

The operation of the apparatus may be thus summarized as follows: Tag position decoder 20 specifies the most significant of the two bits comprising the tag item in the operand according to the numbered output line 1 through 32 which is energized with a D.C. level. The tag decoder circuit in turn senses this bit of the operand and also the bit adjacent to it which in effect may be regarded as the least significant of the two tag item bits.

Depending upon whether these bits are ones or zeros, output pulses are caused to appear on lines 31′ and 33′, respectively, when the lines B and C are pulsed. There is also a pulse on a line A which is applied directly to the line 33′ for reasons which will become apparent in connection with FIG. 3 following.

Figure 3:
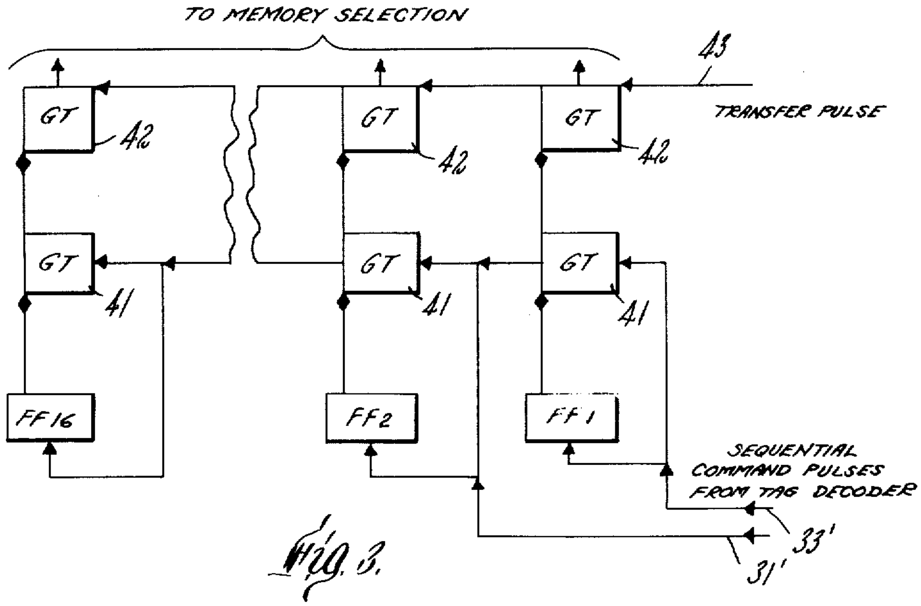
FIG. 3 is a more detailed block diagram of the program counter of FIG. 1.

For a more complete understanding of the manner in which the pulses on lines 31′ and 33′ control the count in the program counter a detailed block diagram of the latter is shown in FIG. 3. With reference now to FIG. 3 it will be observed that there are 16 flip-flops numbered 1 through 16 whose states represent the count. Only 3 of these flip-flops have been shown since they are all connected in like manner. That is to say, each of the flip-flops has its one side connected to an associated pair of gate circuits 41 and 42. Also, the output from gate 41 for flip-flop 1 is passed to the binary input line for flip-flop 2, the output from gate 41 for flip-flop 2 is passed to the binary input line for flip-flop 3, and so forth. Line 33′ from the tag decoder of FIG. 2 is connected to the binary input line for flip-flop 1 and also to the input of the gate circuit 41 for flip-flop 1. Line 31′ is connected to the binary input line for flip-flop 2 and also to the input of the gate circuit 41 for flip-flop 2. Finally, there is provided a line 43 which is seen to be connected as a common input line to the gate circuits 42 so that by means of a single pulse applied to this line, the existing count in the program counter may be read out and passed to the memory selection unit 17 of FIG. 1.

By way of example, assume first that a pulse is produced via the tag decoder on line 33′. The state of flip-flop 1 is adapted to be reversed in response to such a pulse and as a result, the output line from flip-flop 1 will have impressed thereon a positive D.C. level if the initial state of this flip-flop was zero. If, on the other hand, flip-flop 1 was in the one state initially, it would be set to zero by a pulse on line 33′ and a carry would be passed to flip-flop 2 by the gate circuit 41 for flip-flop 1. Such carries proceed from flip-flop to flip-flop until halted by the presence of a deconditioned one of the gates 41.

As will now be apparent, set pulses on line 31′ have the same effect on flip-flop 2 as do pulses applied to flip-flop 1 by way of line 33′. In other words, a pulse on line 31′ serves to step the order of the counter next to the lowest, just as a pulse on line 33′ steps the lowest order. By pulsing the lines A, B and C sequentially, it follows that from one to four counts effectively may be entered in the counter depending upon the sense of the tag items in the operand. If both the tag item bits are zero, a single count will be entered as a result of a pulse on line A. If the least significant bit of the tag item is a 1, another pulse will appear on line 33′ when line B is pulsed, thereby causing a second count to be entered. Similarly, if the most significant bit of the tag item is a 1, two counts will be entered when the line C is pulsed. This is because a pulse on line 31′ effectively gives two counts. When conventional single count operation is desired, then only the line A need be pulsed.

Figure 4:
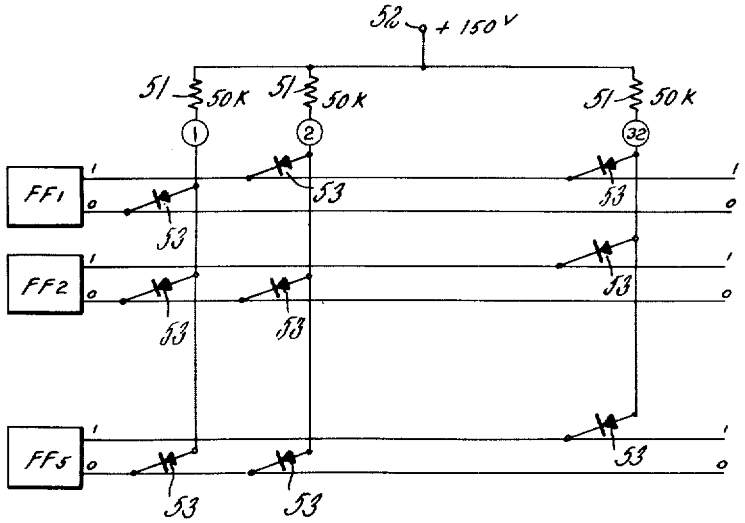
FIG. 4 is a schematic diagram of the tag position decoder of FIG. 1.

In FIG. 4 there is shown a diode decoding matrix suitable for decoding the five bits in an instruction word which designate the location of the tag item in an operand. Toward the left of FIG. 4 are the numbered flip-flops 1 through 5 (three actually shown) of the operations register which contain this information. The corresponding output lines for the flip-flops have been labeled one and zero and have been carried over to the right of FIG. 4, beyond the matrix, merely to illustrate more clearly the manner in which they are connected. The decoding matrix itself consists of a plurality of parallel circuits, each including a resistor 51. One end of each resistor is connected to a source of positive potential at a terminal 52, and the other end of each resistor is connected through associated diode rectifiers 53, to one of the sides of every flip-flop. Thus, the resistor 51 in the first circuit has one of its ends connected to the zero side of flip-flop 1 through one of the diodes 53; to the zero side of flip-flop 2 through another of the diodes; and so forth. Since only flip-flops 1, 2 and 5 have been shown, together with the circuits numbered 1, 2, and 32, the precise manner in which the remainder of the matrix is formed may not be immediately apparent. Therefore an explanation thereof follows. With regard first to flip-flop 1, its zero side is connected in the first output circuit; its one side in the second output circuit; its zero side in the third output circuit; and so on in alternating fashion from circuit to circuit. Flip-flop 2 has its zero side connected in the first two output circuits, its one side in the next two output circuits, and so on in alternating two by two fashion. Flip-flop 3 has its zero side connected in the first four output circuits, its one side in the next four, and so forth. This pattern continues for flip-flops 4 and 5 which in the former case have their zero sides connected in the first eight output circuits, and in the latter case the first sixteen output circuits. To supplement the foregoing there is provided below a table which specifies individually the connections to the flip-flops. The left hand column of the table contains the numbered output lines which are derived from the load resistor circuits. The columns of ones and zeros beneath the flip-flop designations refer to the sides of the flip-flops with which the numbered output lines are in circuit.

| Output Lines | FF1 | FF2 | FF3 | FF4 | FF5 |
|---|---|---|---|---|---|
| 1 | 0 | 0 | 0 | 0 | 0 |
| 2 | 1 | 0 | 0 | 0 | 0 |
| 3 | 0 | 1 | 0 | 0 | 0 |
| 4 | 1 | 1 | 0 | 0 | 0 |
| 5 | 0 | 0 | 1 | 0 | 0 |
| 6 | 1 | 0 | 1 | 0 | 0 |
| 7 | 0 | 1 | 1 | 0 | 0 |
| 8 | 1 | 1 | 1 | 0 | 0 |
| 9 | 0 | 0 | 0 | 1 | 0 |
| 10 | 1 | 0 | 0 | 1 | 0 |
| 11 | 0 | 1 | 0 | 1 | 0 |
| 12 | 1 | 1 | 0 | 1 | 0 |
| 13 | 0 | 0 | 1 | 1 | 0 |
| 14 | 1 | 0 | 1 | 1 | 0 |
| 15 | 0 | 1 | 1 | 1 | 0 |
| 16 | 1 | 1 | 1 | 1 | 0 |
| 17 | 0 | 0 | 0 | 0 | 1 |
| 18 | 1 | 0 | 0 | 0 | 1 |
| 19 | 0 | 1 | 0 | 0 | 1 |
| 20 | 1 | 1 | 0 | 0 | 1 |
| 21 | 0 | 0 | 1 | 0 | 1 |
| 22 | 1 | 0 | 1 | 0 | 1 |
| 23 | 0 | 1 | 1 | 0 | 1 |
| 24 | 1 | 1 | 1 | 0 | 1 |
| 25 | 0 | 0 | 0 | 1 | 1 |
| 26 | 1 | 0 | 0 | 1 | 1 |
| 27 | 0 | 1 | 0 | 1 | 1 |
| 28 | 1 | 1 | 0 | 1 | 1 |
| 29 | 0 | 0 | 1 | 1 | 1 |
| 30 | 1 | 0 | 1 | 1 | 1 |
| 31 | 0 | 1 | 1 | 1 | 1 |
| 32 | 1 | 1 | 1 | 1 | 1 |

In operation a D.C. level is applied to a single output line whose number is determined by the states of the five flip-flops. To illustrate the manner in which the D.C. level is produced, assume for example that all of the flip-flops are in their zero states. As a result, there will be present on the respective zero output lines from the flip-flops, a positive D.C. level, which in the case of conventional type flip-flop circuits frequently employed in this application, will have a magnitude in the neighborhood of +10 volts. Conversely, the one sides of the flip-flops will be held negative at approximately 30 volts. From FIG. 4 and the table relating thereto, it will be observed that each of the five diodes connected to output line 1 will be back biased, since all are connected to the zero sides of the flip-flops where the potential is positive. The number one output line will therefore have a potential of approximately +10 volts. Each one of the other load circuits, on the other hand, will have a low impedance path to the one side of at least one of the flip-flops. Hence, current will be permitted to flow through these other load circuits relatively freely and the potentials at the numbered points 2 through 32 will be much lower (about −30 volts), that is, insufficient to condition the AND circuits 30 of FIG. 2.

If the flip-flop 1 now be considered as set to the one tate, with the remaining flip-flops 2 through 5 in their :ero states, a condition contains which should cause a ›ositive D.C. level to appear on the output line or point ıumber 2. As will be apparent to those skilled in the art, :his condition does obtain because output line 2 has a conıection to the one side of flip-flop 1 rather than to the :ero side as is the case with the remaining flip-flops 2 :hrough 5. Thus, each of the diodes associated with the load circuit from which output line is derived will be ɒack biased, causing the output line or terminal 2 to assume a relatively high positive potential in comparison with the other output lines. In this same fashion, succeedingly higher numbered digits as specified by the states of the flip-flops cause appropriate D.C. levels to appear on correspondingly higher numbered output lines.

Although the illustrative embodiment of the invention described in the foregoing made use of tag items comprised of two bits, it will be apparent that if only the lines A and B are pulsed, then the program counter will be adapted to respond to tag items consisting of only one bit. Also by a suitable modification of the tag decoder circuit, tag items comprising more than two bits may be employed, since it is only necessary for the decoding matrix or tag position decoder to designate one of the adjacent bits comprising the tag item. This assumes, of course, that the number and location of the bits comprising the tag items are fixed relative to the single bit that is specified by the instructional code. If it is desired that they not be so fixed, then the decoders may also be suitably modified to specify the particular options wanted. Various such modifications as this that are within the spirit and scope of the invention will no doubt occur to those skilled in the art so that the invention should not be deemed to be limited to the specific embodiment described herein by way of illustration, but rather should be deemed to be limited only by the scope of the appended claims.

What is claimed is:

1. In a digital computer having storage means for sets of digital signals representing operands and for other sets of signals representing instructions, means for normally retrieving said instructions successively from storage in predetermined order, and means for sensing certain signals of said retrieved instructions and to cause, according to the sense of such signals, transfer of selected operands from storage to a device for utilizing the same in computation operations of the computer, the combination including operand sensing means for selectively sensing a plurality of signals in said operands transferred from said storage means, control means for sensing certain signals in said instructions retrieved from said storage means for controlling by the sense thereof the selective operation of said operand sensing means, program modifying means variably operable to cause different alterations in said predetermined order of ensuing retrieval of instructions by said instruction retrieving means, and circuit means connecting said operand sensing means to operate said program modifying means in accordance with the sense of said operand signals sensed thereby.

2. The combination of claim 1 wherein said operand sensing means is located in the path of transfer of operands from said storage means to said device.

3. The combination of claim 1 wherein said operand sensing means includes a temporary storage register for operands between said storage means and said device.

4. The combination of claim 1 wherein said means for retrieving instructions includes a program counter and said program modifying means includes means to alter the count in said program counter by from two to at least four digits.

5. The combination of claim 1 wherein said control means includes means for decoding said certain signals to provide a single output signal indicative according to the sense of said certain signals of any one of said plurality of signals of an operand, and circuit means for selectively transmitting said output signal to said operand sensing means to cause said operand sensing means to sense the corresponding one of said plurality of operand signals and also at least one other contiguous signal thereof.

References Cited in the file of this patent

UNITED STATES PATENTS

| | | |
|---|---|---|
| 2,799,449 | Turing et al. | July 16, 1957 |
| 2,800,278 | Thomas | July 23, 1957 |

FOREIGN PATENTS

| | | |
|---|---|---|
| 1,099,467 | France | Mar. 23, 1955 |
| 783,086 | Great Britain | Sept. 18, 1957 |